May 26, 1925.
A. SAMUELSON
CONVEYER FOR GLASSWARE
Filed April 7, 1924
1,539,515
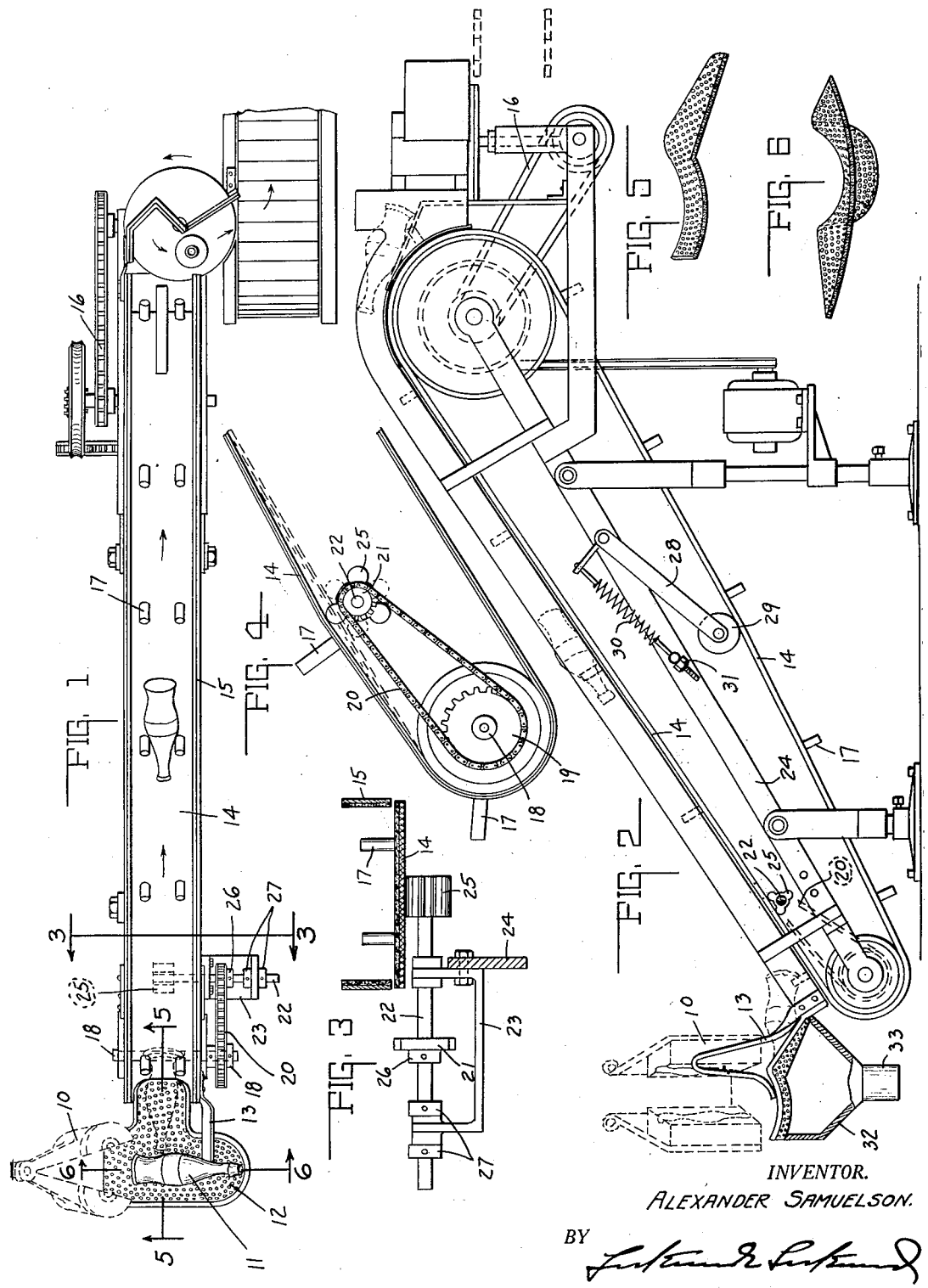
INVENTOR.
ALEXANDER SAMUELSON.
BY
ATTORNEYS.

Patented May 26, 1925.

1,539,515

UNITED STATES PATENT OFFICE.

ALEXANDER SAMUELSON, OF TERRE HAUTE, INDIANA, ASSIGNOR TO CHAPMAN J. ROOT, OF TERRE HAUTE, INDIANA.

CONVEYER FOR GLASSWARE.

Application filed April 7, 1924. Serial No. 704,703.

*To all whom it may concern:*

Be it known that I, ALEXANDER SAMUELSON, a citizen of the United States, and a resident of Terre Haute, county of Vigo, and State of Indiana, have invented a certain new and useful Conveyer for Glassware; and I do hereby declare that the following is a full, clear, and exact description thereof, reference being had to the accompanying drawings, in which like numerals refer to like parts.

This invention relates to a conveyer for glassware and is an improvement upon the prior Patent No. 1,480,063, dated January 8, 1924.

The chief object of this invention is to improve conveyer constructions of the general character indicated by associating with one of the conveyer elements an agitator device that is adapted to prevent the heated glassware from remaining in continuous contact with the relatively cold conveyer for a considerable period of time.

Another chief object of the invention is to prevent bottles of the general character illustrated in Figs. 1 and 2 of the before-mentioned patent from engaging the pins 31 also illustrated therein intermediate the mid portion of the bottle and the bottom, for such engagement has been found to permanently deform bottles of this character.

Another object of the invention is to cool the bottle rather quickly immediately following its discharge from the mold of a bottle making machine.

The chief feature of the invention consists in the association of an agitator with a conveyer construction for accomplishing the first two objects.

Another feature of the invention consists in providing means for cooling the bottle immediately following its discharge from the mold.

The full nature of the invention will be understood from the accompanying drawings and the following description and claims:

In the drawings, Fig. 1 is a plan view of a conveyer construction embodying the invention and showing the same associated with parts of a glass mold and another conveyer. Fig. 2 is a side elevational view thereof, parts being broken away to show parts in section. Fig. 3 is an enlarged sectional view taken on the line 3—3 of Fig. 1 and in the direction of the arrows. Fig. 4 is a side elevational view of the driving mechanism, conveyer and agitator for the latter, the dotted and full lines showing the conveyer and agitator in two positions. Fig. 5 is a sectional view taken on the line 5—5 of Fig. 1 and in the direction of the arrows. Fig. 6 is a similar view of the same part taken on the line 6—6 of Fig. 1 and in the direction of the arrows.

In the drawings there is indicated a sectional mold 10 adapted to discharge a glass bottle 11, and herein said glass bottle is shown including a neck, a main body portion, a bottom and a reduced bottom and a main body connecting portion. The mold 10 automatically discharges the bottles into a spoon 12 which receives the same and turns the bottle by means of the arm 13 so as to discharge the bottle bottom foremost to an endless conveyer belt 14 positioned between the side walls 15 and driven by suitable mechanism indicated generally by the numeral 16. Herein the conveyer belt 14 is shown provided with a plurality of pairs of pins 17, the pins of each pair being in spaced relation with each other, and as herein shown the pairs of pins are likewise in spaced relation with each other.

The bottle when discharged bottom foremost rides upon the belt and is conveyed upwardly thereby, said conveyer being inclined as shown clearly in Fig. 2. As the conveyer movement continues, the bottle is gradually carried upwardly, but also slides downwardly until the neck of the bottle passes between a pair of pins 17 and thus further downward, and, therefore, longitudinal movement of the bottle with respect to the conveyer is prevented.

It sometimes happens that a bottle is discharged from the spoon 12, as shown clearly by the dotted lines at the base of the conveyer, in such a manner that the pair of pins 17 engage the bottle at its restricted portion intermediate the bottom and main body portion. When this occurs, the bottle will be deformed, since it is relatively hot. Means, therefore, is provided for displacing the bottles when so positioned, but which means is not adapted to displace the bottle when positioned as shown by the full line bottle on the conveyer in Fig. 1.

Herein suitable means secures such displacement, whereby the bottle, when displaced as aforesaid, slides longitudinally of the belt until engaged in its proper position with its neck between the next pair of pins 17. Such means is herein illustrated as an agitator which is adjustably associated with the conveyer construction and preferably is operable by the same and in timed relation therewith. The idler shaft 18 of the conveyer construction is extended as shown clearly in Fig. 1 and supports a sprocket wheel 19 that is adapted to drive a sprocket chain 20, which in turn drives a sprocket wheel 21 mounted upon an axially slidable shaft 22, in turn supported by a bracket 23 suitably secured to a frame member 24 of the conveyer construction. The shaft 22 is rotatably supported in the bearings provided by the bracket member 23, and one end terminates beneath the conveyer 12 and carries an agitating element 25. This agitating element is very similar to a shamrock or clover leaf, being provided with a suitable number of curved projections thereon which are preferably in spaced relation. Herein three of said projections are shown. The conveyer belt 14 is adapted to lie flat when simultaneously tangent to two of the projections of the agitator element 25. The agitating element 25 is preferably positioned approximately along the longitudinal center line of the conveyer construction, and for this purpose the sprocket pinion 21 includes a hub portion 26 for adjustably securing the pinion upon the shaft 22 and in alignment with the sprocket gear 19. A pair of adjusting collars 27 are detachably secured to the shaft 22 upon opposite sides of one of the bearings formed in the frame 23, and thus accurately position the agitator member 25 through the shaft 22 in the desired position with respect to the conveyer. The conveyer construction as shown clearly in Fig. 2 includes a bell crank support 28 which terminates in a tension roller 29 bearing upon the under side of the belt 14 for taking up the slack therein. This slack adjuster also permits the agitator to slightly elevate the belt when the projections on the agitator elevate said belt. The bell crank tensioning device is herein shown provided with an adjustable tensioning means, such as the spring 30, the tension of which is adjusted by means of the nut 31.

In addition to the agitator engaging the bottom of the belt and disengaging a misplaced bottle from the pin 17 when the bottle is caught thereby, as shown by the dotted lines in Fig. 1, said agitator is adapted to continuously agitate the belt while the belt is moving, so that it will agitate all the bottles on the belt for a considerable period of belt travel, and thus prevent all of the bottles from lying in one position in contact with the belt. It is to be understood that the bottles are relatively hot while the belt is relatively cold, and such a difference in temperature causes checking and cracking in the bottles if the same cool unevenly. The aforesaid agitation, therefore, prevents continuous contact between the bottles and the belt for a considerable period of belt travel and incidental thereto there is imparted to each of the bottles a slight rolling motion, that is, the bottles revolve upon their longitudinal axes, thus presenting a new surface to the belt surface in addition to the intermediate contact of the bottle with the belt surface by reason of the aforesaid agitation.

To rather quickly cool the bottles so that they will not be deformed, by subsequent handling in the transportation from the mold to the leers where they are tempered, the bottle-receiving member into which the molds discharge the bottles is herein shown of screen formation. This screen formation may be of any suitable character, but is herein shown as a perforated plate. Associated with said plate is a housing 32 supplied by a conduit 33 with cooled air. The bottle, therefore, immediately upon its discharge from the mold and its reception by the T-shaped spoon 12 is cooled by the cool air discharged from the supply conduit 33.

It is to be understood that while the invention has been described specifically with reference to the structure shown in the beforementioned patent, the same is not limited thereto in its broader features. Likewise, it is not intended to limit the invention to bottles or heated glassware by the use of the terminology "bottles" and "heated glassware" in the specifications and claims, but the same is intended to include other molded articles of similar character. The foregoing specific description of the invention is, therefore, to be considered as illustrative and not restrictive in character; and the many modifications which will readily suggest themselves to others skilled in this art all are considered to be with the broad purview of the invention, reference being had to the appended claims.

The invention claimed is:

1. A conveyer construction for bottles after they have been formed and before they are cold having a movable conveyer belt, means thereon for catching the bottles and holding them with their axes extending longitudinally of the belt as they are conveyed thereby, and means for preventing a predetermined undesirable longitudinal holding of the bottles by the aforesaid means.

2. A conveyer construction for bottles after they have been formed and before they are cold having a movable conveyer belt, a pair of pins projecting therefrom for normally engaging the neck of a bottle and conveying it with its axes extending longitudinally of the belt, and means for insuring that the bottle will only be transported by the pins engaging the neck.

3. A conveyer construction for bottles after they have been formed and before they are cold having a belt, side bars located at the two sides of the belt to prevent the bottle from escaping therefrom, means on the belt for transporting the bottles therewith and adapted to catch the bottles and hold them with their axes extending longitudinally of the belt as they are conveyed thereby, and means for preventing a predetermined undesirable longitudinal holding of the bottles by the aforesaid means.

4. A conveyer for bottles after they have been formed and before they are cold having a movable conveyer belt, means thereon adapted to engage the bottles and hold them while they are being conveyed, and means for agitating the belt to intermittently separate the bottles from the belt surface.

5. A conveyer for bottles after they have been formed and before they are cold having a movable conveyer belt, means thereon adapted to engage the bottles and hold them while they are being conveyed, and means for agitating the belt to intermittently separate the bottles from the surface of the belt for a portion of the belt travel.

6. A conveyer for bottles after they have been formed and before they are cold having a movable conveyer belt, means thereon adapted to engage the bottles and hold them while they are being conveyed, and means for agitating the belt to intermittently separate the bottles from the holding means.

7. A conveyer for bottles after they have been formed and before they are cold having a movable conveyer belt, means thereon adapted to engage the bottles and hold them while they are being conveyed, and means for agitating the belt to intermittently separate the bottles from the holding means and the belt surface.

8. A conveyer for bottles after they have been formed and before they are cold having a movable conveyer belt adapted to transport the bottles in a longitudinal position with their axes extending longitudinally of the belt, and means for agitating the belt to rotate the bottles on their axes while on the belt.

9. A conveyer for bottles after they have been formed and before they have been completely cooled including an endless belt, an agitator for said belt, and a single source of power for driving said belt and adapted to operate said agitator.

10. In a conveyer for bottles, the combination of a conveyer belt, and a clover leaf agitator positioned therebeneath for intermittently agitating the belt.

11. In a conveyer for bottles, the combination of a conveyer belt, a clover leaf agitator positioned therebeneath for intermittently agitating the belt, and means for operating said belt and said agitator in timed relation.

In witness whereof, I have hereunto affixed my signature.

ALEXANDER SAMUELSON.